(12) United States Patent
Dosch et al.

(10) Patent No.: US 12,458,031 B2
(45) Date of Patent: *Nov. 4, 2025

(54) HARD TACO SHELL AND METHOD FOR PRODUCING THE HARD TACO SHELL

(71) Applicant: General Mills, Inc., Minneapolis, MN (US)

(72) Inventors: Christine M. Dosch, Minneapolis, MN (US); John James Fenske, Shoreview, MN (US); Jason Herzog, St. Louis Park, MN (US); James David Nelson, Bloomington, MN (US); Christine M. Nowakowski, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 490 days.

This patent is subject to a terminal disclaimer.

(21) Appl. No.: 17/963,635

(22) Filed: Oct. 11, 2022

(65) Prior Publication Data

US 2023/0032008 A1 Feb. 2, 2023

Related U.S. Application Data

(63) Continuation-in-part of application No. 17/339,437, filed on Jun. 4, 2021, now Pat. No. 11,998,018.

(51) Int. Cl.
| | |
|---|---|
| *A21D 13/24* | (2017.01) |
| *A21D 13/42* | (2017.01) |
| *B65B 23/00* | (2006.01) |
| *B65D 77/02* | (2006.01) |
| *B65D 85/36* | (2006.01) |

(52) U.S. Cl.
CPC ............ *A21D 13/24* (2017.01); *A21D 13/42* (2017.01); *B65B 23/00* (2013.01); *B65D 77/02* (2013.01); *B65D 85/36* (2013.01); *B65B 2220/18* (2013.01)

(58) Field of Classification Search
CPC ........ A21D 13/28; A21D 13/40; A21D 2/181; A21D 13/33; A21D 13/24; A21D 13/42; A23L 7/117; B65B 23/00; B65B 55/20; B65B 2220/18; B65D 85/36; B65D 77/02; A23P 20/20
USPC ........................................................ 426/549
See application file for complete search history.

(56) References Cited

U.S. PATENT DOCUMENTS

| | | |
|---|---|---|
| 3,930,049 A | 12/1975 | Mattson |
| 4,781,932 A | 11/1988 | Skarra et al. |
| 5,236,727 A | 8/1993 | Huston |

(Continued)

*Primary Examiner* — Subbalakshmi Prakash
(74) *Attorney, Agent, or Firm* — Jordan IP Law, LLC; Tina Yin Sowatzke, Esq.

(57) ABSTRACT

A taco shell is produced by applying a plasticizing agent to a targeted region including a base or spine portion of a hard taco shell and lower sections of taco shell sidewalls, thereby softening the targeted region, preferably across a strip width between 16 mm-20 mm, and enabling the sidewalls of the hard taco shell to engage each other without cracking or otherwise breaking the taco shell. As a further result, when the taco shell is bitten, the softened targeted region has some hinging flexibility or pliability which reduces the potential for any crack propagation. Therefore, the structural integrity of the hard taco shell can be better maintained during packaging and while be eaten, resulting in retention of the fillings and less mess. If desired, an anti-migration agent can also be applied to assure containment of the plasticizing agent in the targeted region.

20 Claims, 4 Drawing Sheets

(56) References Cited

U.S. PATENT DOCUMENTS

| | | |
|---|---|---|
| 5,716,675 A | 2/1998 | Anderson et al. |
| 5,932,268 A | 8/1999 | Thomas et al. |
| 2006/0147587 A1 | 7/2006 | Kovich et al. |
| 2013/0224363 A1 | 8/2013 | Kent |

HARD TACO SHELL AND METHOD FOR PRODUCING THE HARD TACO SHELL

CROSS-REFERENCE TO RELATED APPLICATIONS

This application represents a continuation-in-part of U.S. patent application Ser. No. 17/339,437, filed Jun. 4, 2021, entitled "Hard Taco Shell and Method for Producing the Hard Taco Shell", pending. The entire content of this application is incorporated herein by reference.

BACKGROUND OF THE INVENTION

The invention pertains to the art of food production and, more particularly, to the production of hard taco shells.

Due to the time demands placed on consumers by the everyday activities of modern life, the preparation of food products and meals from scratch has decreased and the popularity of premade or partially premade foods has increased dramatically. One such product is the hard taco shell. A taco shell is essentially a hard, generally U-shaped baked or fried tortilla designed to hold a variety of fillings. Due to the hardness of the taco shell, the shape of the shell, the placement of the fillings and the manner in which such tacos are typically eaten, taco shells tend to break apart rather easily at various locations rather than just at the exact location where bitten. Most problematic is the undesired breaking the base or lowermost section of the shell, often referred to as the spine of the shell, as this results in the integrity of the shell being lost and an overall messy eating experience in which the fillings fall out of the taco shell. Since one of the advantages of a taco is that utensils are not necessary, it would be desirable to provide a taco shell that minimizes the tendency of the shell to break apart at the base portion in order to minimize any fillings falling out during consumption.

SUMMARY OF THE INVENTION

The invention achieves the above goal by applying a plasticizing agent to a base or spine portion of a hard taco shell, thereby softening the base portion. As a result, when the taco shell is bitten, the softened base portion has some hinging flexibility or pliability which reduces the potential for any crack propagation. Therefore, the structural integrity of the hard taco shell can be better maintained while be eaten, resulting in retention of the fillings and less mess.

The plasticizing agent can be applied in any one of various ways, while preferably being limited to the base portion. In preferred embodiments, the plasticizing agent is applied with a strip width between 4-20 mm, more preferably in the order of 8-16 mm, and most preferably about 14 mm. The application can take various forms, including targeted spraying, rolling, brushing or dipping of preformed taco shells. Although other plasticizing agents could be employed, a preferred embodiment employs glycerin which has been found effective to raise the relevant Aw into a rubbery region. Optionally, a migration limiting agent can be applied to confine the plasticizing agent to the targeted base or spine region. For instance, one or more hydrocolloids could be provided, either before or after application of the plasticizing agent, in order to limit or even prevent migration of the plasticizing agent outside of the targeted region.

Additional objects, features and advantages of the invention will become more readily apparent from the following detailed description of preferred embodiments thereof when taken in conjunction with the drawings wherein like reference numerals refer to common parts in the several views.

DETAILED DESCRIPTION OF THE INVENTION

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

Figure 1:
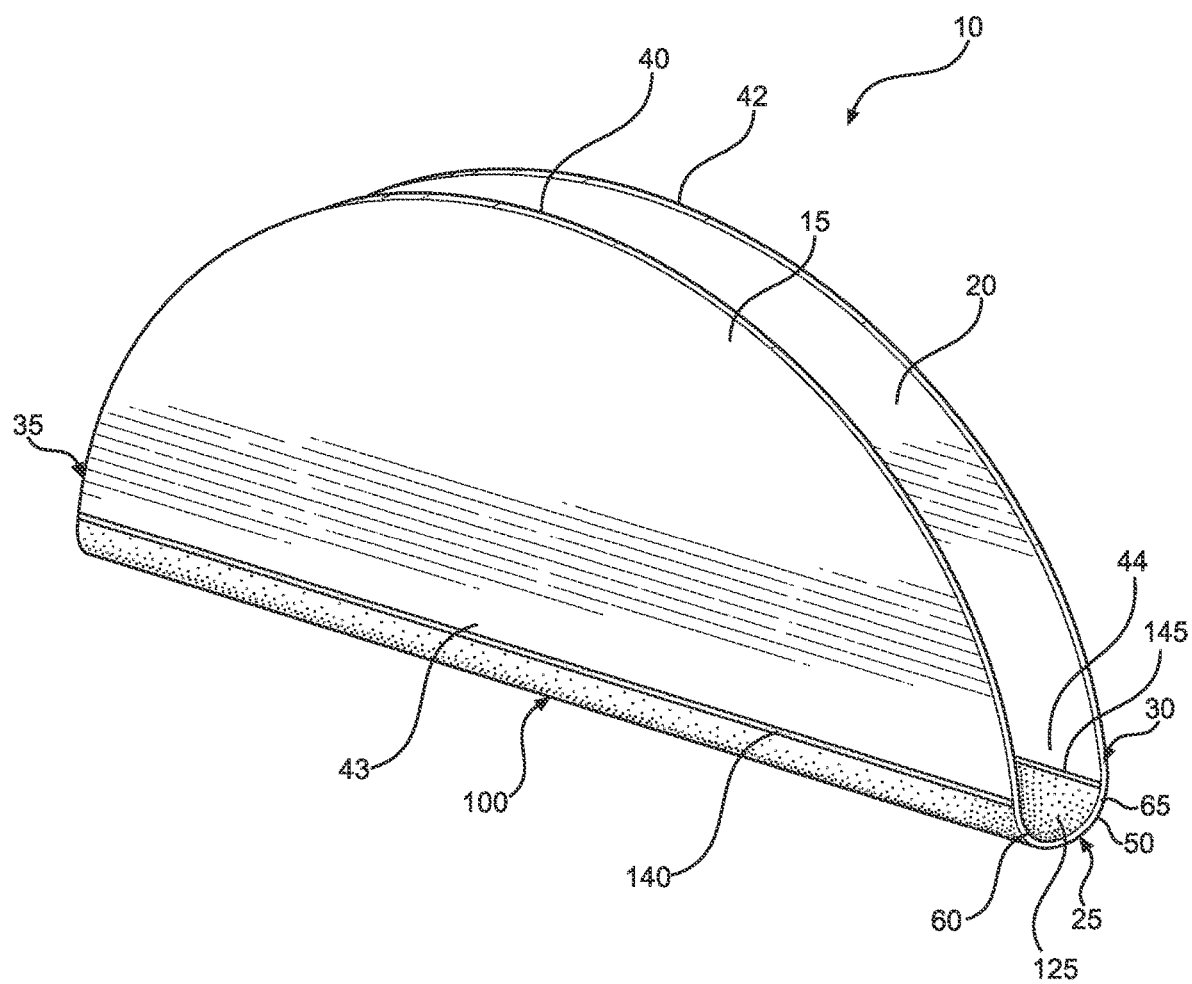
FIG. 1 is a perspective view of a hard taco shell including the coated base or spine section according to the invention.

Although not shown, it is known to produce hard taco shells in various ways. From a mass production standpoint, it is typical to create a sheet of dough, made from corn, wheat or other flours, direct the dough sheet beneath a cutter assembly to establish individual dough pieces each having an outer perimeter which generally defines a circle. After a dough piece is cut, the piece is folded onto a mold to form a desired shape, e.g., a U-shaped dough piece. The shaped dough piece is then fried or baked to produce a hard taco shell which retains the desired shape. At this point, it should be recognized that the dough piece could take other shapes depending on the mold (not shown) used to hold the piece during the cooking process. Most notably, the dough piece could be shaped to produce a flat bottom (a flat bottom, as opposed to a curved bottom, U-shape shell) or even a sharper angled bottom (generally V-shaped) taco shell. In any case, a hard, shaped taco shell is shown in FIG. 1, where it is labeled with reference numeral 10. Taco shell 10 has a first sidewall portion 15 which is substantially parallel to a second sidewall portion 20, and a base or spine portion 25. Taco shell 10 also has a first end 30 and a second end 35 that are longitudinally spaced from one another along the taco shell 10, with sidewall portions 15 and 20 including upper peripheral edges 40 and 42, as well as lower sections 43 and 44, all extending from first end 30 to second end 35.

For purposes of this invention description, regardless of whether taco shell 10 has a U, flat or otherwise shaped base portion, base portion 25 interconnects first and second sidewall portions 15 and 20 to establish a unitary product. Of course, a wide range of base/sidewall dimensions are possible. In addition, for purposes of this description, base portion 25 includes a lowermost portion 50, leading to angling corner or connecting portions 60 and 65 which, in turn, connect to first and second sidewall portions 15 and 20 respectively. At this point, it should be recognized that connecting portions 60 and 65 can take various geometric shapes, with lowermost portion 50 connecting to a respective sidewall portion 15, 20 through a curved connecting portion or an angled (right angle or otherwise) connecting portion. More importantly, as will be detailed more fully below in connection with the invention, the connecting portions 60 and 65 essentially establish hinges between the remainder of base portion 25 and sidewall portions 15 and 20.

With a conventional hard taco shell, when a consumer grabs the taco shell and bites one end, for example, the taco shell is inherently squeezed and tends to break, in addition to across both sidewall portions, also along the base portion, with the particular break locations depending on the size of the bite, squeezing force, etc. In fact, it is not uncommon for a taco shell to actually break both at the bite location and at a location relatively far from where it was bitten, resulting in a messy eating experience in which fillings fall out of the taco shell. To minimize or prevent this problem, one or more longitudinally extending sections of base portion 25 is made flexible or pliable. Although the extent of base portion 25 which is made flexible or pliable can vary from the entire base portion 25 to just at least connecting portions 60 and 65 (preferably entirely from first end 30 to second end 35), the arrangement shown in FIG. 1 will be described in further detail as an exemplary embodiment. As shown here, a coating 100 has been applied to base portion 25, with the coating 100 being applied in both lowermost portion 50 and connecting portions 60 and 65 to soften and make these coated sections pliable.

Coating 100 can be applied in various ways, including targeted spraying, rolling or brushing application, or even partially dipping taco shell 10 in the coating. The coating itself is a plasticizing agent. Although various plasticizing agents could be employed, a preferred embodiment employs glycerin (e.g., solutions up to 75-100% glycerin) which has been found effective to raise the relevant Aw into a rubbery region. In the most preferred forms of the invention, for a standard sized hard taco shell, the plasticizing agent is applied to base portion 25 to establish a longitudinal strip 125 having a width between 4 mm-20 mm, more preferably in the order of 8-16 mm, and most preferably about 14 mm. Again, other plasticizing agent could be employed, either alone or in combination and either concentrated or in a solution, including: propylene glycol; sugar alcohols such as maltitol, sorbitol, xylitol and erythritol; low molecular weight carbohydrates such as glucose, maltose and sucrose; and/or polysaccharides such as inulin. In the preferred embodiment shown in FIG. 1, coating 100 is applied on the entire base portion 25 but, again, sections of base portion could be targeted, such as just a central section of lowermost portion 50, connecting portions 60 and 65 or a combination of both with spaced sections therebetween. Optionally, a migration limiting agent can be applied, either separately or part of coating 100, to define the targeted base or spine region. For instance, one or more hydrocolloids could be provided, either before or after application of the plasticizing agent, in order to limit or even prevent migration of the plasticizing agent outside of the targeted region. For instance, in FIG. 1, a migration limiting agent is applied as elongated strips 140 and 145 across sidewalls 15 and 20 at the junctures of connecting portions 60 and 65, thus limiting or preventing the migration of the plasticizing agent into sidewalls 15 and 20. Of course, if spaced plasticizing agent coatings are applied, additional strips of the migration limiting agent could also be used.

In general, hard taco shells are known to be brittle or otherwise rigid, plastic and crisp. However, in accordance with the invention, the plasticized region is flexible and pliable, or otherwise elastic and tough. Strictly speaking, the peak force or overall hardness of the shell is not significantly different (about a 5-8% change only), but the plasticizing agent increases the toughness of the system. This is evidenced as the plasticized region actually takes longer to reach maximum hardness during formation. In testing, 100% of the conventional (crisp and brittle) hard shell tacos fractured (broke) when exposed to a simulated biting force. On the other hand, narrow band (about 4-6 mm as outlined above) plasticized shells made in accordance with the invention fractured only ⅓ or approximately 33% of the time when exposed to the same simulated biting force, while the other approximately 66% of these shells either just deformed in the plasticized region or actually elastically sprang back after deformation. In comparison, when the plasticized region increased to the preferred 8-16 and up to 20 mm range outlined above to establish wide band plasticized shells, none of the shells fractured when exposed to the same simulated biting force. More specifically, the wide band plasticized shells under this scenario either just deformed or sprung back at a nearly even percentage across the wide band plasticized shells tested.

Figure 2:
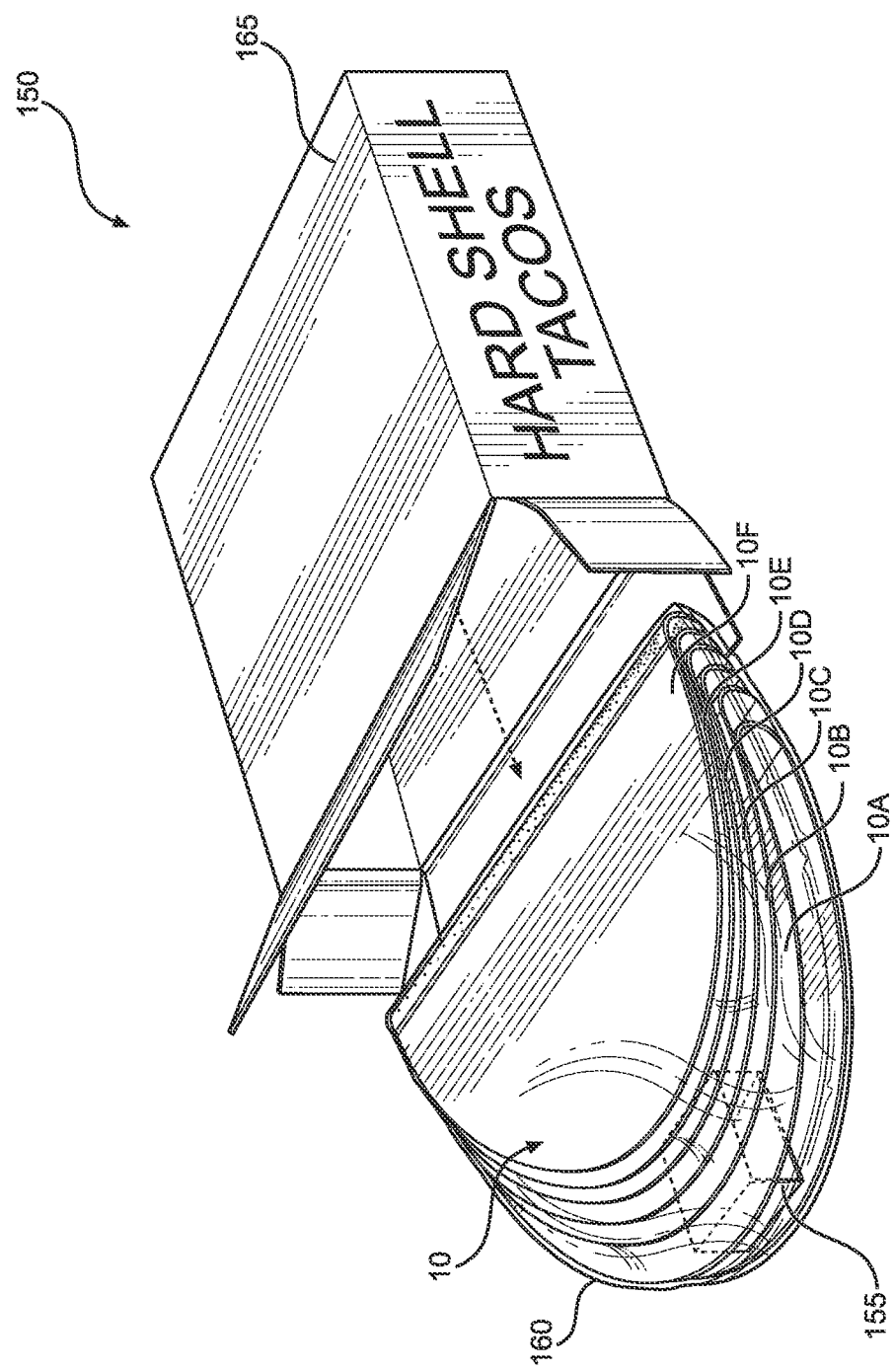
FIG. 2 is an exploded view of a package of the hard taco shells of FIG. 1 in accordance with the invention.

FIG. 2 shows an exploded view of a package 150 of the hard taco shells 10 of FIG. 1 produced in accordance with the invention. Here, a series of hard taco shells 10A-10F, each with at least one section coated with a plasticizer, are nested together, a spacer 155 is provided between the sidewalls of the first nested taco shell 10A, and the nested taco shells 10A-10F are wrapped for sealing purposes with a transparent outer film 160. The nested, wrapped taco shells 10A-10F are shown just removed from an outer container 165 preferably made of cardboard. Basically, this figure merely illustrates how the hard taco shells of the present invention can be packaged in the same way as conventional taco shells.

Figure 3:
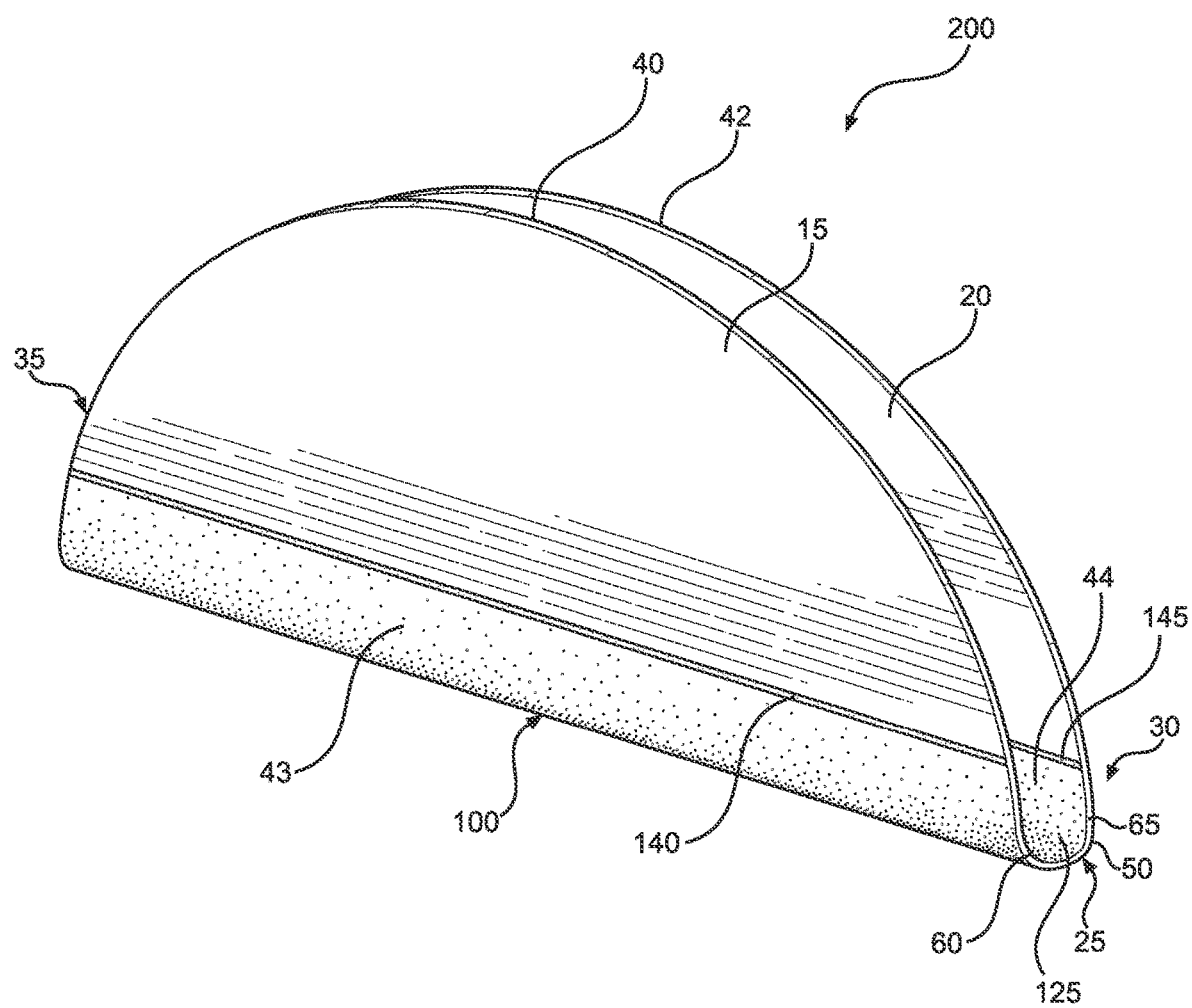
FIG. 3 is a perspective view of a hard taco shell including a coated base or spine, similar to FIG. 1, but with the coating extending further up the sides of the shell.
Figure 4:
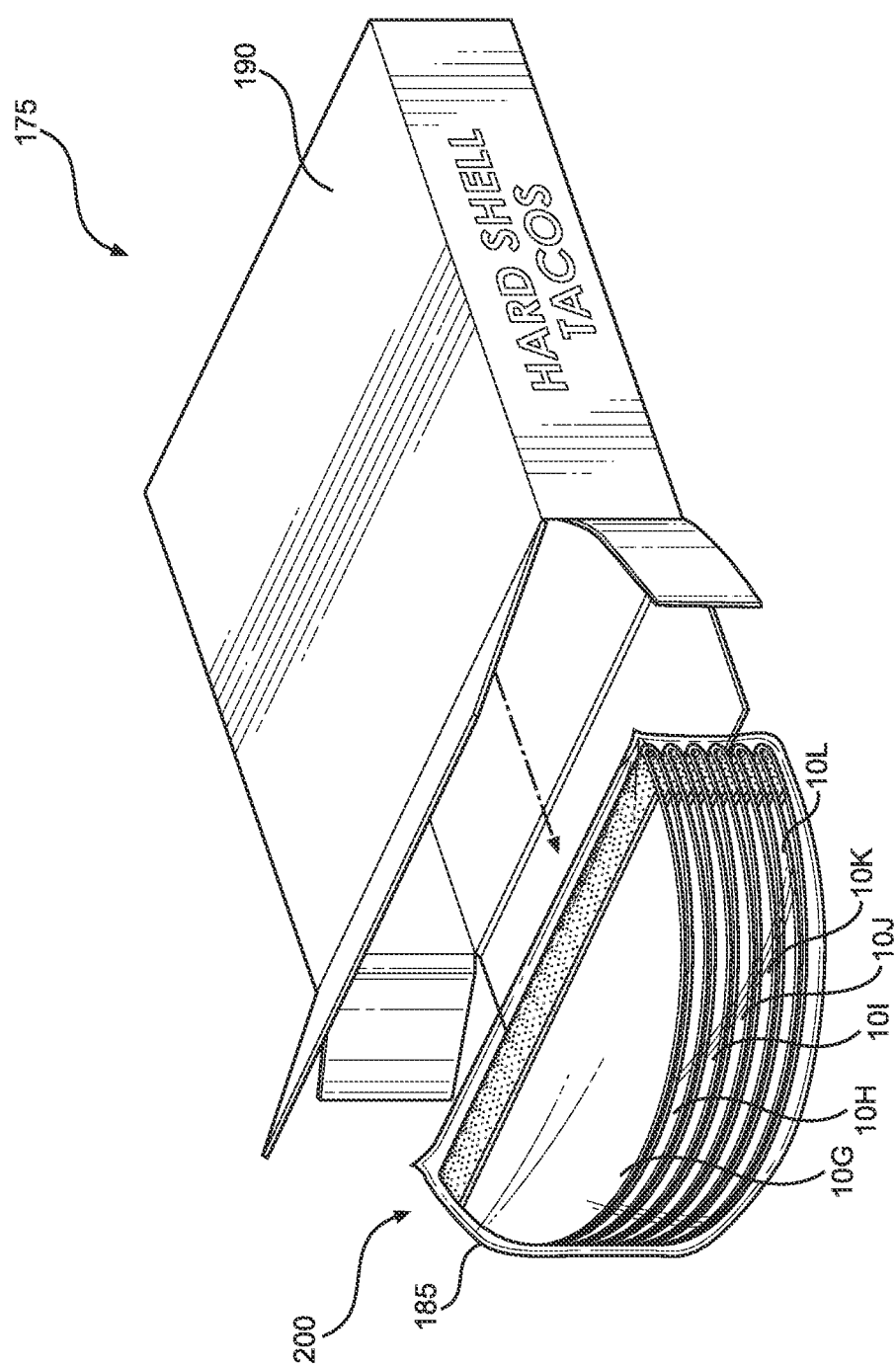
FIG. 4 is an exploded view of a package including a stack of the hard taco shells of FIG. 3.

FIG. 3 shows a hard taco shell 200 similar to that of FIG. 1 such that like reference numerals have been used to refer to corresponding parts. FIG. 3 simply presents an embodiment wherein coating 100 extends further up opposing sidewalls 15 and 20, basically fully encompassing lower sections 44 and 45, thereby encompassing all the lowered curved portions of the hard taco shell 200. Generally, the coating 125 extends in the higher 16-20 mm range and can be applied to both surfaces of sidewalls 15 and 20. As set forth above, migration limiting agent can be applied as elongated strips 140 and 145 across sidewalls 15 and 20, thus limiting or preventing the migration of the plasticizing agent further along sidewalls 15 and 20. This embodiment particularly illustrates that, by enlarging the coated region and thereby further increasing the range of hinging flexibility and/or pliability in this targeted region, a series of hard taco shells 10G-10L (see FIG. 4) can be tightly nested together. If fact, the respective sidewalls 15 and 20 can even be in contact, i.e., engage each other, and can actually lay flat upon each other without cracking or otherwise breaking the hard taco shell 10G-10L, particularly when the nested taco shells 10G-10L are wrapped for sealing purposes with a transparent outer film 185 and placed in a container 190 in forming an overall package 175 as shown in FIG. 4. As depicted, the nested, wrapped taco shells 10G-10L are just removed from the more compact outer container 190 versus outer container 165 of FIG. 2 (generally same width and depth, but reduced height as illustrated in comparing FIGS. 2 and 4). Of course, like taco shell 10, taco shell 200 can be heated before consumption. Upon heating, the flexibility of the spine portion is reduced but, importantly, the taco shells still remain quite pliable, specifically still enabling the targeted region of each taco shell to flex without cracking.

Based on the above, it should be readily apparent that, in accordance with the present invention, one or more sections of the base or spine portion of the hard taco shell has the plasticizing agent applied thereto, thereby softening the base or spine portion at this targeted region(s). As a result, when the taco shell is bitten, the softened base or spine section has some hinging flexibility or pliability which reduces the potential for any crack propagation. Therefore, as a consumer eats the hard taco of the invention, the sidewall portions can be squeezed together without breaking base portion such that the structural integrity of the hard taco shell can be better maintained while be eaten, resulting in retention of the fillings and less mess. While certain preferred embodiments of the present invention have been set forth, it should be understood that various changes or modifications could be made without departing from the invention.

The invention claimed is:

1. A method of producing a hard taco shell having opposing sidewalls including lower sections joined by a base portion comprising applying a plasticizing agent to a targeted section of the hard taco shell, with the targeted section including the base portion and each of the lower sections of the sidewalls to soften the targeted section, thereby increasing hinging flexibility or pliability of the targeted section versus a remainder of each of the opposing sidewalls and enabling the opposing sidewalls to even engage each other without breaking the hard taco shell.

2. The method of claim 1, wherein the plasticizing agent is applied to a strip width between 16-20 mm.

3. The method of claim 1, wherein the plasticizing agent is applied as a coating through one of spraying, rolling, brushing or dipping of the taco shell.

4. The method of claim 1, wherein the plasticizing agent is glycerin.

5. The method of claim 1, wherein the plasticizing agent includes: propylene glycol; sugar alcohols; low molecular weight carbohydrates; and/or polysaccharides.

6. The method of claim 1, wherein the plasticizing agent entirely encompasses the lower sections of the opposing sidewalls of the hard taco shell.

7. The method of claim 6, further comprising applying a migration limiting agent to contain the plasticizing agent in the targeted section of the base portion.

8. The method of claim 7, wherein the migration limiting agent comprises a hydrocolloid.

9. The method of claim 1, further comprising packaging a plurality of the hard taco shells by nesting the hard taco shells, wherein the opposing sidewalls of a respective said hard taco shells engage one another.

10. The method of claim 9, further comprising wrapping the nested hard taco shells, and placing the wrapped hard taco shells in a carton.

11. The method of claim 1, further comprising heating the hard taco shell prior to consumption, while still enabling the targeted section of the hard taco shell to flex without cracking.

12. A hard taco shell produced according to the method of claim 1.

13. A hard taco shell comprising:
a first hard shell sidewall including a first lower section;
a second hard shell sidewall including a second lower section; and
a base portion connecting the first and second lower sections of the first and second hard shell sidewalls, wherein a targeted section with a plasticizing agent applied thereto, including the base portion and each of the lower sections of the sidewalls, is more flexible or pliable versus a remainder of each of the first and second sidewalls, enabling the first and second sidewalls to even engage each other without breaking the hard taco shell.

14. The hard taco shell of claim 13, wherein the plasticizing agent is applied only in the targeted section.

15. The hard taco shell of claim 14, wherein the plasticizing agent is contained in a strip width between 16-20 mm.

16. The hard taco shell of claim 14, wherein the plasticizing agent is glycerin.

17. The taco shell of claim 14, wherein the plasticizing agent includes: propylene glycol; sugar alcohols; low molecular weight carbohydrates; and/or polysaccharides.

18. The hard taco shell of claim 14, further comprising a migration limiting agent containing the plasticizing agent in the targeted section.

19. The hard taco shell of claim 18, wherein the migration limiting agent comprises a hydrocolloid.

20. The hard taco shell of claim 13, wherein the hard taco shell is nested and wrapped with additional ones of said hard taco shells and located in a carton, with the first and second sidewalls of a respective said hard taco shell engaging each another.

* * * * *